US011770333B2

(12) United States Patent
Yang et al.

(10) Patent No.: US 11,770,333 B2
(45) Date of Patent: Sep. 26, 2023

(54) METHOD FOR ASSIGNING IDENTIFIERS TO SWITCHES IN STACK, OPTICAL CABLE, AND RELATED DEVICE

(71) Applicant: Huawei Technologies Co., Ltd., Shenzhen (CN)

(72) Inventors: Jie Yang, Nanjing (CN); Jincheng Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/405,020

(22) Filed: May 7, 2019

(65) Prior Publication Data

US 2019/0349292 A1 Nov. 14, 2019

(30) Foreign Application Priority Data

May 8, 2018 (CN) ........................ 201810433839.2

(51) Int. Cl.

*H04L 45/58* (2022.01)
*H04L 41/0806* (2022.01)
*H04L 61/50* (2022.01)

(52) U.S. Cl.

CPC ........ *H04L 45/583* (2013.01); *H04L 41/0806* (2013.01); *H04L 61/50* (2022.05)

(58) Field of Classification Search

CPC ... H04L 45/583; H04L 61/50; H04L 41/0806; H04Q 11/0005; G02B 6/3817; G02B 6/4401; G02B 6/43; G02B 6/44; G02B 6/46

See application file for complete search history.

(56) References Cited

U.S. PATENT DOCUMENTS

| | | | |
|---|---|---|---|
| 5,802,333 | A | 9/1998 | Melvin |
| 2003/0204631 | A1 | 10/2003 | Pinkerton et al. |
| 2006/0023640 | A1 | 2/2006 | Chang et al. |

(Continued)

FOREIGN PATENT DOCUMENTS

| | | | |
|---|---|---|---|
| CN | 1770738 | A | 5/2006 |
| CN | 1885810 | A | 12/2006 |

(Continued)

OTHER PUBLICATIONS

Foreign Communication From A Counterpad Application, European Application No. 19170729.8, Extended European Search Report dated Oct. 21, 2019, 7 pages.

(Continued)

*Primary Examiner* — Emmanuel L Moise
*Assistant Examiner* — Xiang Yu
(74) *Attorney, Agent, or Firm* — Conley Rose, P.C.

(57) ABSTRACT

A method for assigning identifiers to switches in a stack includes detecting, by a switch, a terminal identifier stored in an optical module that is connected to a stack port of the switch, where the optical module is at one end of an optical cable; and if a condition is met, assigning, by the switch, identifiers to N stackable switches along a direction starting from the switch to another switch connected to the stack port, where the condition includes: a value of the terminal identifier is a specified value, and N is greater than or equal to 2. According to this application, an efficiency of assigning the identifiers to the switches in a stack can be improved.

19 Claims, 12 Drawing Sheets

Switch 1
Stack port 2
Stack port 1
Optical cable
Switch N
Stack port 2
Stack port 1
indicates red indicates blue

(56) References Cited

U.S. PATENT DOCUMENTS

2006/0092832 A1* 5/2006 Santoso ................ H04L 45/583 370/218
2006/0092849 A1* 5/2006 Santoso .................. H04L 49/55 370/244
2006/0092853 A1* 5/2006 Santoso .................. H04L 49/35 370/252
2010/0182933 A1 7/2010 Hu et al.
2010/0188991 A1 7/2010 Raleigh
2012/0122251 A1 5/2012 Yamada et al.
2013/0343764 A1* 12/2013 Coffey ............... H04Q 11/0005 385/89
2014/0181275 A1 6/2014 Lin et al.
2014/0204953 A1 7/2014 Tsubota
2015/0288567 A1* 10/2015 Lin ..................... H04L 41/0631 370/254
2016/0191454 A1 6/2016 Sinha et al.
2016/0204959 A1 7/2016 Liang et al.

FOREIGN PATENT DOCUMENTS

CN 101170483 A 4/2008
CN 101478434 A 7/2009
CN 102986172 A 3/2013
CN 103051737 A 4/2013
CN 103701631 A 4/2014
CN 104079423 A 10/2014
CN 104283811 A 1/2015
CN 104395799 A 3/2015
CN 102365853 B 12/2015
JP H07147586 A 6/1995
JP H10222458 A 8/1998
JP 2014140095 A 7/2014
JP 2017135624 A 8/2017
RU 2336652 C2 10/2008
WO 2016190912 A1 12/2016
WO 2017141080 A1 8/2017
WO 2018017340 A1 1/2018

OTHER PUBLICATIONS

Wang, B., "Design And Realization of Router Stack Based on IRF," Apr. 2015, 64 pages.

Muslam, M., et al., "Network-Based Mobility and Host Identity Protocol," IEEE Wireless Communications and Networking Conference: Mobile and Wireless Networks, 2012, 6 pages.

Xiujun, S., "Research And Implementation of Cross-network Stack Based on Distributed Switches," Apr. 2016, 71 pages.

* cited by examiner

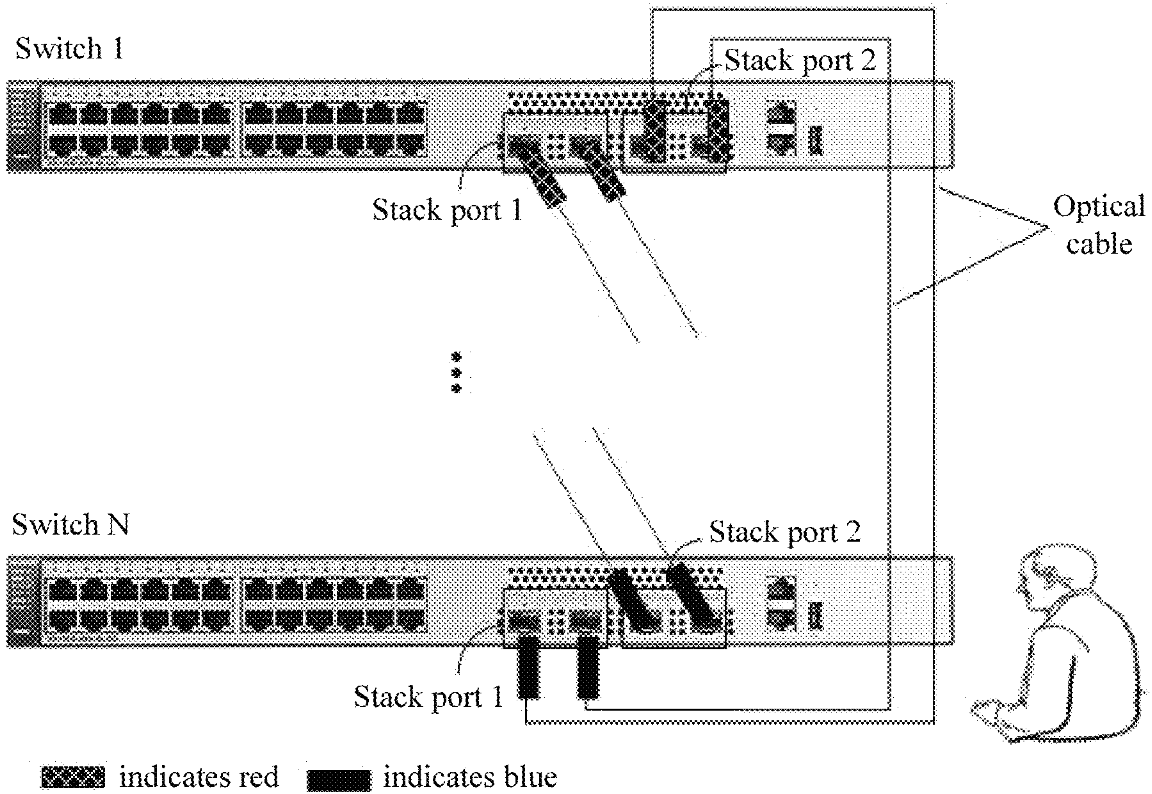

FIG. 1

A switch detects a terminal identifier stored in an optical module that is connected to a stack port of the switch, where the optical module is at one end of an optical cable — S201

If a condition is met, the switch assigns identifiers to N stackable switches along a direction starting from the switch to another switch connected to the stack port, where the condition includes: a value of the terminal identifier is a specified value, and N is greater than or equal to 2 — S202

FIG. 2 indicates red indicates blue

METHOD FOR ASSIGNING IDENTIFIERS TO SWITCHES IN STACK, OPTICAL CABLE, AND RELATED DEVICE

CROSS-REFERENCE TO RELATED APPLICATIONS

This application claims priority to Chinese Patent App. No. 201810433839.2 filed on May 8, 2018, which is incorporated by reference.

TECHNICAL FIELD

This application relates to the field of network communications technologies, and in particular, to a method for assigning identifiers to switches in a stack, an optical cable, and a related device.

BACKGROUND

A stackable switch is an Ethernet switch that supports a stacking function. The stacking function means connecting two or more Ethernet switches by using a stack cable, to constitute a stack system to externally provide unified network management. Interfaces and hardware resources of the stack system are all interfaces and hardware resources of these Ethernet switches. An Ethernet switch that supports the stacking function is referred to as a stackable switch. A stack system may include a plurality of stackable switches, and each switch is a member of the stack system. The switches in the stack system may be a master stackable switch and a slave stackable switch based on an assigned role. Member stackable switches have a same database, and due to an increase in an interface quantity, a plurality of interfaces may be connected to uplink and downlink to expand bandwidth.

To facilitate management of the switches in the stack system, each switch in the stack system has a unique stack identifier. The stack identifier can be configured manually and is 0 by default. The stack identifier affects numbering of a switch port. For example, after a switch is added to a stack, a port number of the switch is changed to stack identifier/sub-board number/port number (for example, for a port GE0/0/1 before the switch is added to the stack, if a stack identifier of the switch is 2, a number of the port GE0/0/1 is changed to GE2/0/1 after the switch is added to the stack).

When a new member is added to the stack system, if a stack identifier of the new member conflicts with that of an existing member, the master stackable switch assigns an idle identifier to the new member.

When a new stack is built or a stack member changes, if stack identifiers of switches are not specified manually before the stack is built, the stack identifiers of the members in the stack system are random due to reasons such as a startup sequence. If the stack identifiers need to be assigned to the switches based on a specified order, the stack identifiers need to be first manually configured for the switches, or the stack is first built, and then the stack identifiers of the switches are manually modified. As a result, deployment configuration time of the switches in the stack system is long.

SUMMARY

This application provides a method for assigning identifiers to switches in a stack, an optical cable, and a related device, so as to improve an efficiency of assigning identifiers to switches in a stack.

According to a first aspect, this application provides a method for assigning identifiers to switches in a stack, including: detecting, by a switch, a terminal identifier stored in an optical module that is connected to a stack port of the switch, where the optical module is at one end of an optical cable; and if a condition is met, assigning, by the switch, identifiers to N stackable switches along a direction starting from the switch to another switch connected to the stack port, where the condition includes: a value of the terminal identifier is a specified value, and N is greater than or equal to 2.

According to the technical solution provided in the first aspect, after detecting the terminal identifier stored in the optical module that is connected to the stack port of the switch, the switch can assign the identifiers to the N stackable switches along the direction starting from the switch to the another switch connected to the stack port of the switch. This resolves problems that the identifiers of the N stackable switches are randomly assigned and the identifiers of the N stackable switches need to be manually modified, thereby shortening deployment configuration time of the switches in the stack, and improving an efficiency of assigning the identifiers to the switches in the stack.

With reference to the first aspect, in a possible implementation, the condition further includes: all values of terminal identifiers stored in all optical modules that are connected to one or more stack ports of the switch are the specified value. This implementation can reduce a user misoperation probability.

According to a second aspect, this application provides a device for assigning identifiers to switches in the stack, including: a detection unit configured to detect a terminal identifier stored in an optical module that is connected to a stack port of a switch, where the optical module is at one end of an optical cable; and an assignment unit configured to: if a condition is met, assign identifiers to N stackable switches along a direction starting from the switch to another switch connected to the stack port, where the condition includes: a value of the terminal identifier is a specified value, and N is greater than or equal to 2.

According to the technical solution provided in the second aspect, after the detection unit detects the terminal identifier stored in the optical module that is connected to the stack port of the switch, the assignment unit can assign the identifiers to the N stackable switches along the direction starting from the switch to the another switch connected to the stack port of the switch. This resolves problems that the identifiers of the N stackable switches are randomly assigned and the identifiers of the N stackable switches need to be manually modified, thereby shortening deployment configuration time of the switches in the stack, and improving an efficiency of assigning the identifiers to the switches in the stack.

With reference to the second aspect, in a possible implementation, the condition further includes: all values of terminal identifiers stored in all optical modules that are connected to one or more stack ports of the switch are the specified value. This implementation can reduce a user misoperation probability.

According to a third aspect, this application provides an optical cable, where the optical cable includes a first optical module and a second optical module, and the first optical module and the second optical module have different appearances; the first optical module is located at one end of the optical cable, and the second optical module is located at the other end of the optical cable; and the first optical module stores a terminal identifier, and a value of the terminal identifier is a specified value.

According to the technical solution provided in the third aspect, after detecting a terminal identifier of one end of the optical cable connected to a stack port, a switch can assign identifiers to N stackable switches along a direction from the switch to another switch connected to a stack port. This resolves problems that the identifiers of the N stackable switches are randomly assigned and the identifiers of the N stackable switches need to be manually modified, thereby shortening deployment configuration time of the switches in the stack, and improving an efficiency of assigning the identifiers to the switches in the stack.

With reference to the third aspect, in a possible implementation, the second optical module stores the terminal identifier, and a value of the terminal identifier is different from the specified value. This implementation provides an optical cable, where terminal identifiers of two ends of the optical cable are different.

With reference to the third aspect, in a possible implementation, the second optical module stores no terminal identifier. This implementation provides an optical cable, where one end of the optical cable stores a terminal identifier, and the other end of the optical module stores no terminal identifier.

According to a fourth aspect, this application provides a device for assigning identifiers to switches in a stack, including a processor and one or more stack ports coupled to the processor. The processor is configured to detect a terminal identifier stored in an optical module that is connected to a stack port of the device, where the optical module is at one end of an optical cable. The processor is further configured to: if a condition is met, assign identifiers to N stackable switches along a direction starting from the device to another device connected to the stack port, where the condition includes: a value of the terminal identifier is a specified value, and N is greater than or equal to 2; and the stack port is configured to receive/send a packet.

According to the technical solution provided in the fourth aspect, after detecting the terminal identifier stored in the optical module that is connected to the stack port of the device, the processor of the device can assign the identifiers to the N stackable switches along the direction starting from the device to the another device connected to the stack port of the device. This resolves problems that the identifiers of the N stackable switches are randomly assigned and the identifiers of the N stackable switches need to be manually modified, thereby shortening deployment configuration time of the switches in the stack, and improving an efficiency of assigning the identifiers to the switches in a stack.

With reference to the fourth aspect, in a possible implementation, the condition further includes: all values of terminal identifiers stored in all optical modules that are connected to one or more stack ports of the device are the specified value. This implementation can reduce a user misoperation probability.

BRIEF DESCRIPTION OF DRAWINGS

The following describes the accompanying drawings used in this application.

FIG. 1 is a schematic diagram of manually connecting N stackable switches by a user by using an optical cable according to this application.

FIG. 2 is a schematic flowchart of a method for assigning identifiers to switches in a stack according to this application.

Figures 3A, 3B, 3C:
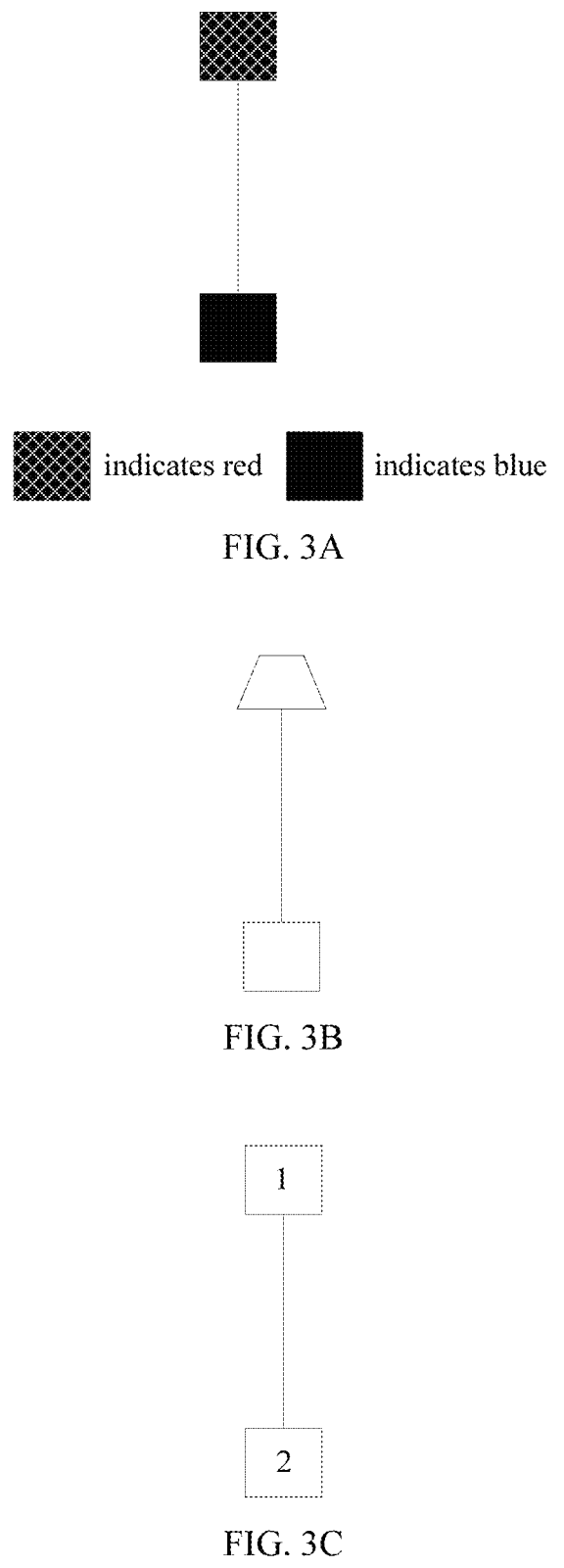

FIG. 3A is a schematic appearance diagram of two ends of an optical cable according to this application.

FIG. 3B is a schematic appearance diagram of two ends of another optical cable according to this application.

FIG. 3C is a schematic appearance diagram of two ends of still another optical cable according to this application.

DESCRIPTION OF EMBODIMENTS

Figure 3D:
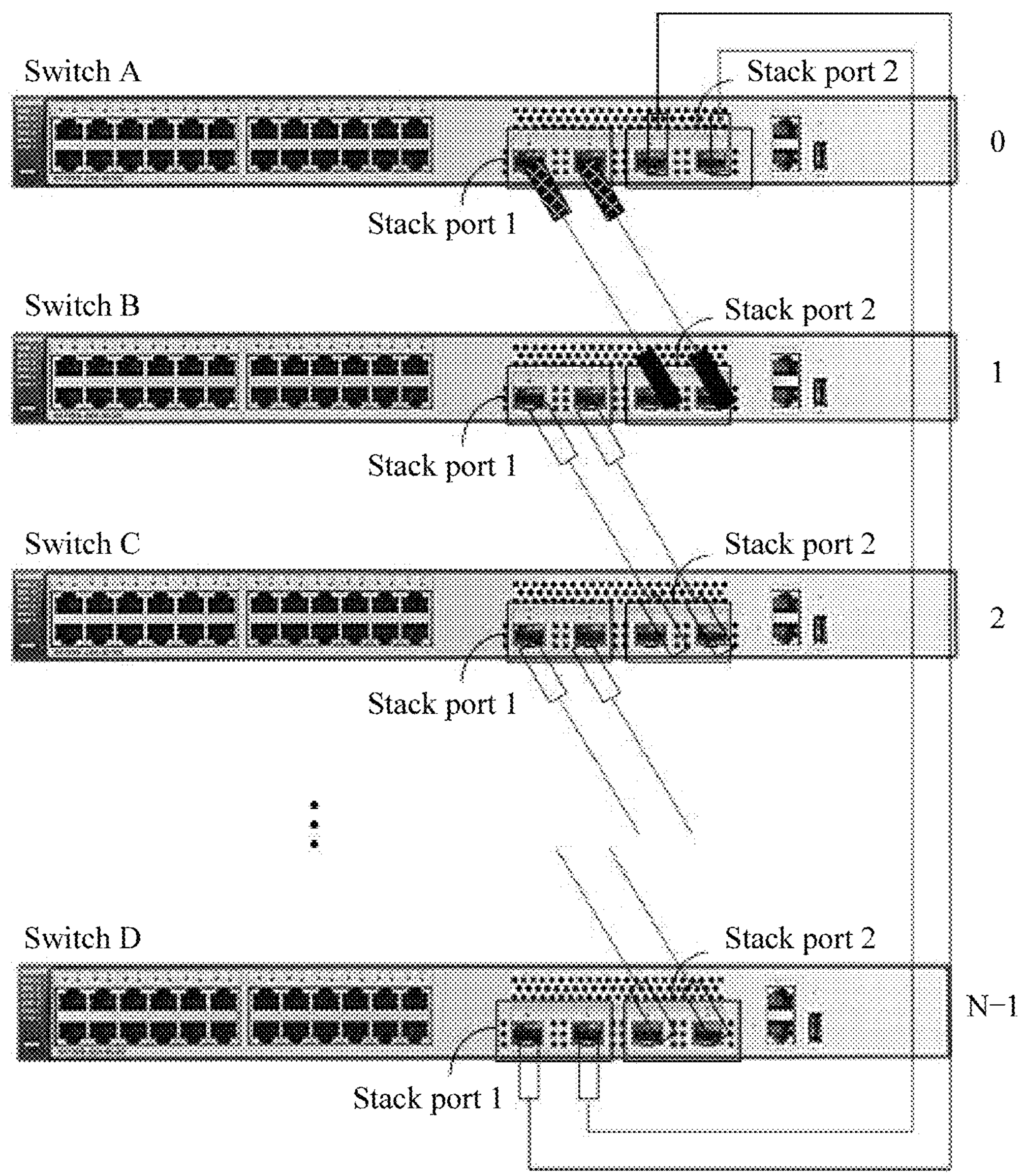
FIG. 3D is a schematic diagram of building a stack based on a ring topology by using switches in a stack according to this application.

FIG. 1 is a schematic diagram of a scenario in which a user manually connects N stackable switches by using an optical cable according to this application.

As shown in FIG. 1, before a stackable switch is powered on (that is, before a program of the stackable switch runs), the user may manually connect, based on a ring topology in a vendor-provided specification by using an optical cable, N vendor-produced stackable switches to build a stack, where N is greater than or equal to 2. It should be understood that a manner of connecting the stackable switches by using the optical cable is not limited to a manual manner. The stackable switches may be connected by using the optical cable in another manner (for example, by using a robot).

Before the stackable switches are delivered from a factory, any one of the stackable switches may store a detection program that is used for detecting a terminal identifier stored in an optical module of the optical cable that is connected to a stack port of the stackable switch.

The following describes in detail some main technical terms (for example, stacking, a stack port, and an optical cable) used in the embodiments of this application.

Specifically, stacking may mean combining together a plurality of switches supporting a stack feature, to logically form one switch.

An optical cable is used to connect a switch to another switch in the stack by using a stack port, so as to build a stack.

In the embodiments of this application, any stackable switch may include one or more stack ports.

The stack port may be a stack port dedicated for stacking, or may be a non-dedicated stack port. The non-dedicated stack port may serve as an Ethernet port, or may serve as a stack port. Which type of port the non-dedicated stack port serves as may be determined by configuration, or may be determined automatically. For example, two cables with different appearances (for example, one black cable and one colorful cable) are provided. Optical modules at two ends of a cable of one appearance store stack identifiers, and optical modules at two ends of a cable of the other appearance store no stack identifiers. The former type of cable may be referred to as a stack cable, and the latter type of cable may be referred to as an Ethernet cable. When an administrator intends to build a stack, the cable that stores the stack identifiers is used to connect switches. The switches read the stack identifiers and build a stack based on the stack identifiers. Correspondingly, a port connected to the cable serves as a stack port.

According to a method for assigning identifiers to switches in a stack provided in this embodiment of this application, after the user manually connects, based on the ring topology in the vendor-provided specification by using the optical cable, the N vendor-produced stackable switches to build the stack, the switch may automatically assign specified identifiers to the N stackable switches.

With reference to FIG. 2, the following describes in detail a method for assigning identifiers to switches in a stack according to an embodiment of this application. FIG. 2 shows an example of a schematic flowchart of the method for assigning identifiers to switches in a stack. As shown in FIG. 2, the method may include at least the following steps.

S201: A switch detects a terminal identifier stored in an optical module that is connected to a stack port of the switch, where the optical module is at one end of an optical cable.

In this embodiment of this application, the switch executes a detection program used for detecting the terminal identifier in the optical module that is connected to the stack port of the switch, and can detect the terminal identifier stored in the optical module that is connected to the stack port of the switch. For example, a value of the terminal identifier may be 0 or 1. A terminal identifier whose value is 0 is different from a terminal identifier whose value is 1, and one of the two values is a specified value. The terminal identifiers are in a one-to-one correspondence with the optical modules that store the terminal identifiers. If the stack port is a non-dedicated stack port, the optical cable is a stack cable. Optical modules at two ends of the stack cable store stack identifiers. In addition, one of the optical modules stores a terminal identifier whose value is the specified value, and the other optical module stores no terminal identifier or stores a terminal identifier whose value is not the specified value.

A position, of the optical module that stores the terminal identifier, in the optical cable may be distinguished by a terminal appearance of the optical cable. The terminal appearance may include: a terminal color, a terminal shape, a terminal pattern, a terminal character, or the like. FIG. 3A to FIG. 3C show some examples of the terminal appearance.

As shown in FIG. 3A, the position, of the optical module that stores the terminal identifier, in the optical cable may be distinguished by the terminal color. If the optical modules at the two ends of the optical cable store the terminal identifiers, positions, of the optical modules that store different terminal identifiers, in the optical cable may be distinguished by two different colors such as red and blue.

As shown in FIG. 3B, the position, of the optical module that stores the terminal identifier, in the optical cable may be distinguished by the terminal shape. If the optical modules at the two ends of the optical cable store the terminal identifiers, positions, of the optical modules that store different terminal identifiers, in the optical cable may be distinguished by two different terminal shapes such as square and trapezoid.

As shown in FIG. 3C, the position, of the optical module that stores the terminal identifier, in the optical cable may be distinguished by the terminal character. If the optical modules at the two ends of the optical cable store the terminal identifiers, positions, of the optical modules that store different terminal identifiers, in the optical cable may be distinguished by two different terminal characters such as 1 and 2.

For example, the terminal appearance of the optical cable is the terminal color of the optical cable, and the position, of the optical module that stores the terminal identifier, in the optical cable is distinguished by the terminal colors of the optical cable.

If the optical modules that are separately located at the two ends of the optical cable store the terminal identifiers, and the terminal identifiers stored in the optical modules that are located at the two ends of the optical cable are different, positions, of the optical modules that store the different terminal identifiers, in the optical cable may be distinguished by two different colors (for example, red and blue).

If the optical module located at one end of the optical cable stores the terminal identifier, and the optical module located at the other end of the optical cable stores no terminal identifier, the position, of the optical module that stores the terminal identifier, in the optical cable may be distinguished by one color (for example, red or blue). In other words, the optical module that stores the terminal identifier is located at one colored end of the optical cable, and the optical module that stores no terminal identifier is located at the other non-colored end of the optical cable.

S202: If a condition is met, the switch assigns identifiers to N stackable switches along a direction starting from the switch to another switch connected to the stack port of the switch, where the condition includes: a value of the terminal identifier is a specified value, and N is greater than or equal to 2.

In this embodiment of the application, if two types of optical cables are used by the N stackable switches to build a stack, the following two cases T1 and T2 may be included.

Case T1: One is an X-type optical cable: Optical modules that are separately located at two ends of the optical cable store the terminal identifiers, and values of the terminal identifiers stored in the optical modules at the two ends of the optical cable are different. The other is a Y-type optical cable: Optical modules that are separately located at two ends of the optical cable store no terminal identifier.

In case T1, as shown in FIG. 3D, two different types of optical cables, X and Y, are used by the N stackable switches to build the stack based on a ring topology. If a switch detects that a value of a terminal identifier stored in an optical module that is connected to a stack port of the switch is a specified value, the switch (for example, a switch A or a switch B) can assign identifiers to the N stackable switches along a direction starting from the switch to another switch connected to the stack port of the switch. In FIG. 3D, the value of the terminal identifier in the optical module located at one end of the optical cable or the value of the terminal identifier in the optical module located at the other end of the optical cable may be the specified value, but the values of the terminal identifiers separately stored in the optical modules located at the two ends of the optical cable may not be the specified value at the same time.

For example, in FIG. 3D, if the value of the terminal identifier detected by the switch A is the specified value, the switch A can assign, by using the switch A as a start point, an identifier 0 to the switch A, an identifier 1 to the switch B, an identifier 2 to a switch C, . . . , and an identifier N−1 to a switch D.

Figure 3E:
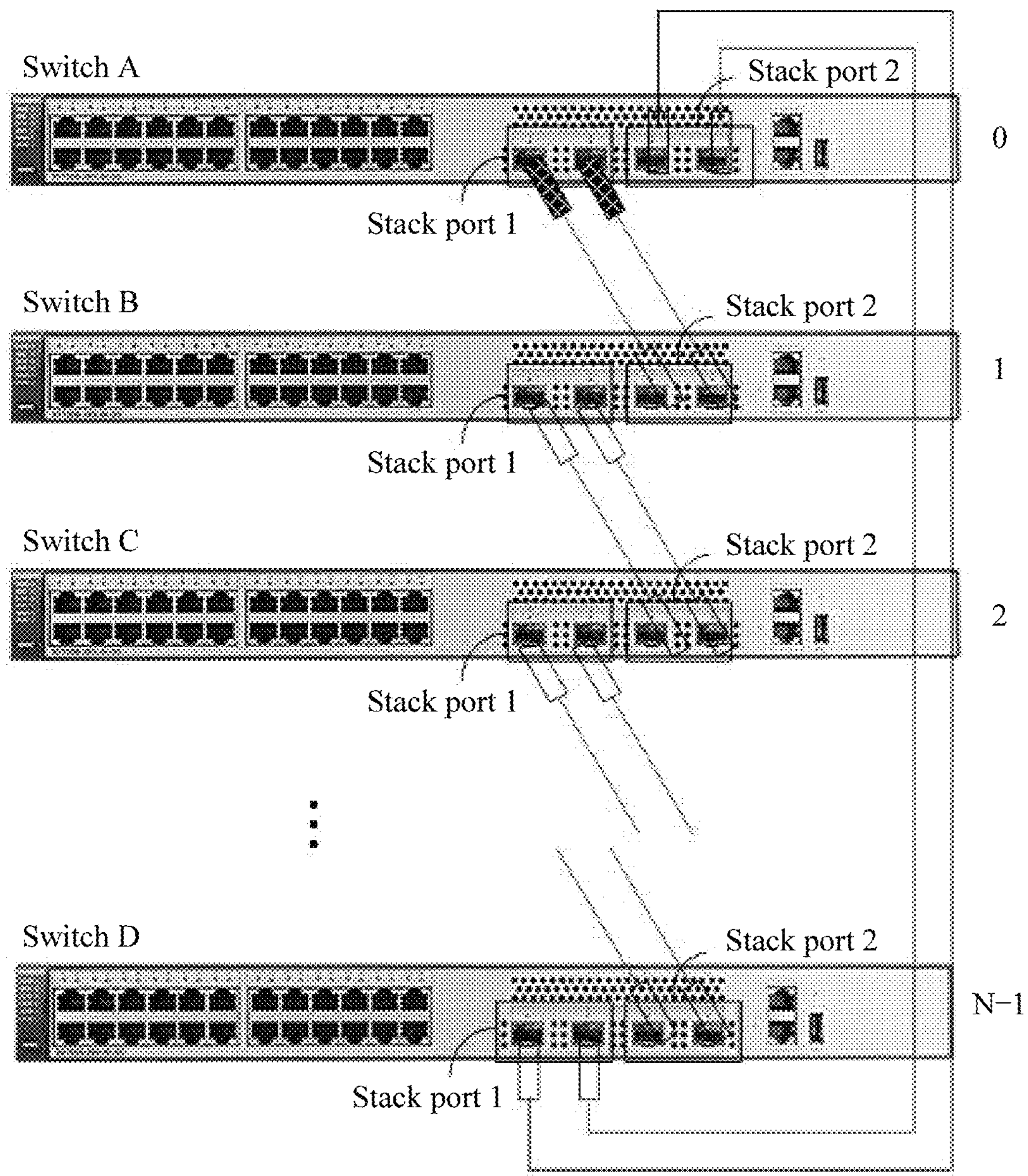
FIG. 3E is another schematic diagram of building a stack based on a ring topology by using switches in a stack according to this application.
Figure 3F:
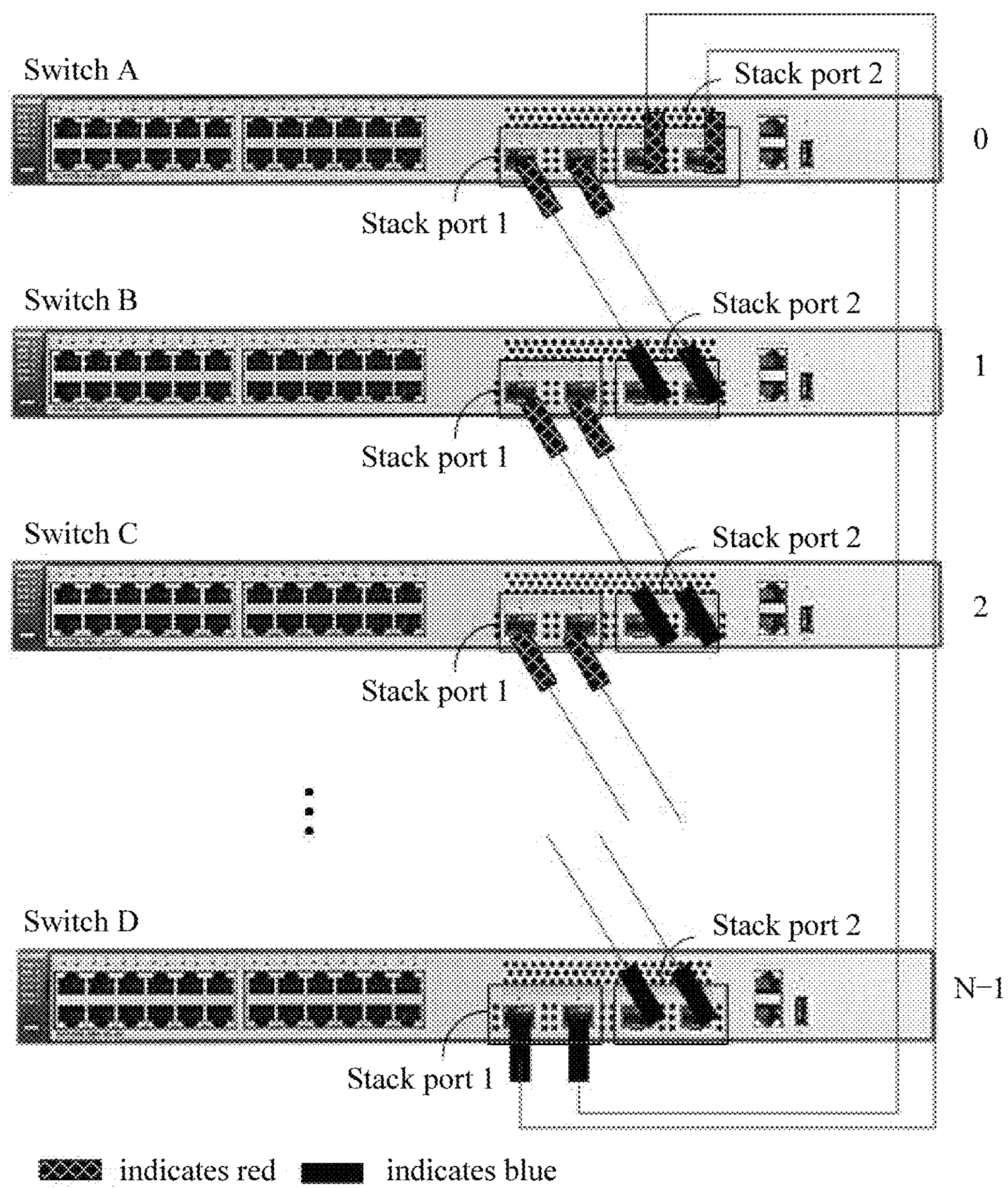
FIG. 3F is still another schematic diagram of building a stack based on a ring topology by using switches in a stack according to this application.
Figure 3G:
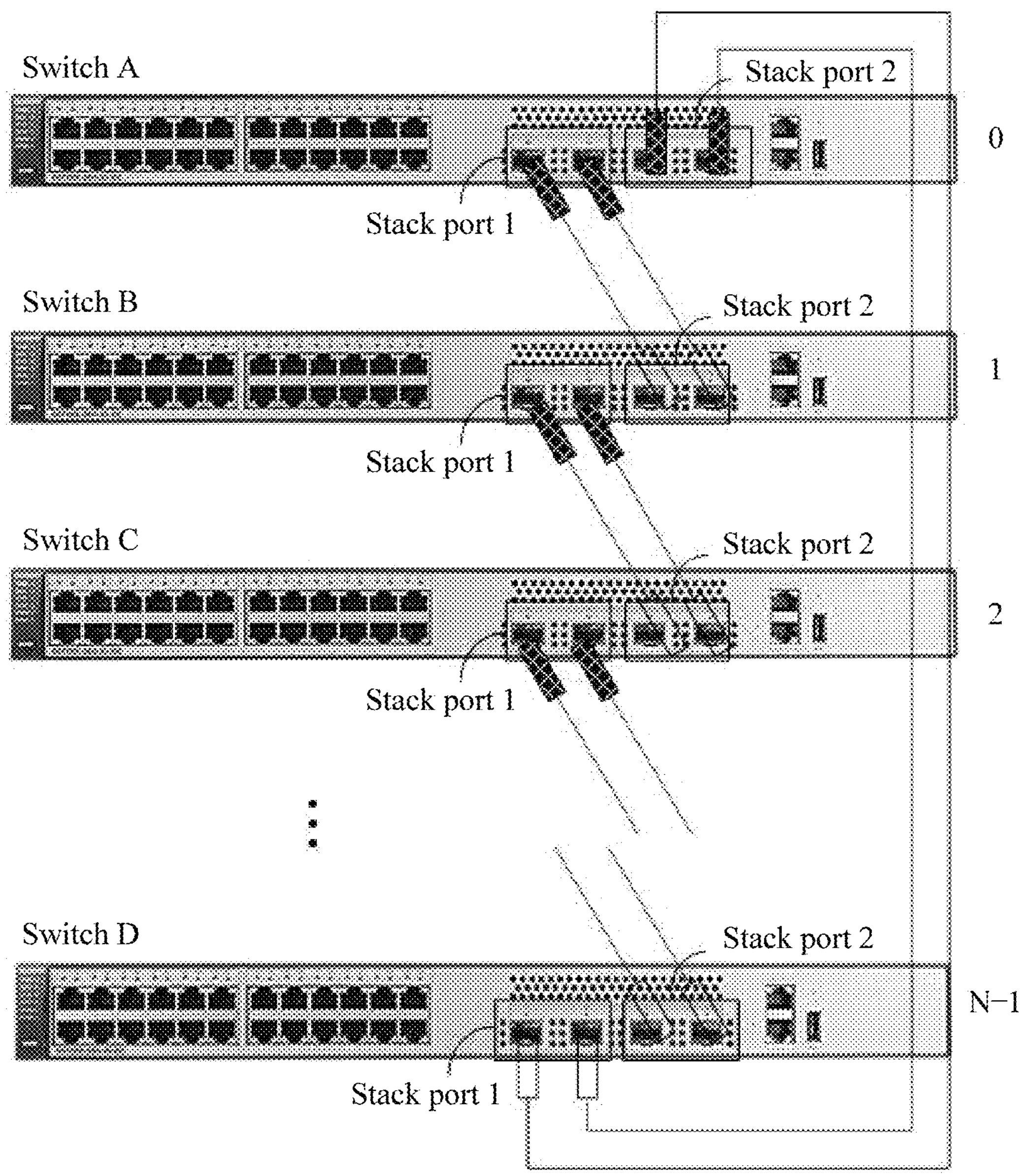
FIG. 3G is yet another schematic diagram of building a stack based on a ring topology by using switches in a stack according to this application.
Figure 3H:
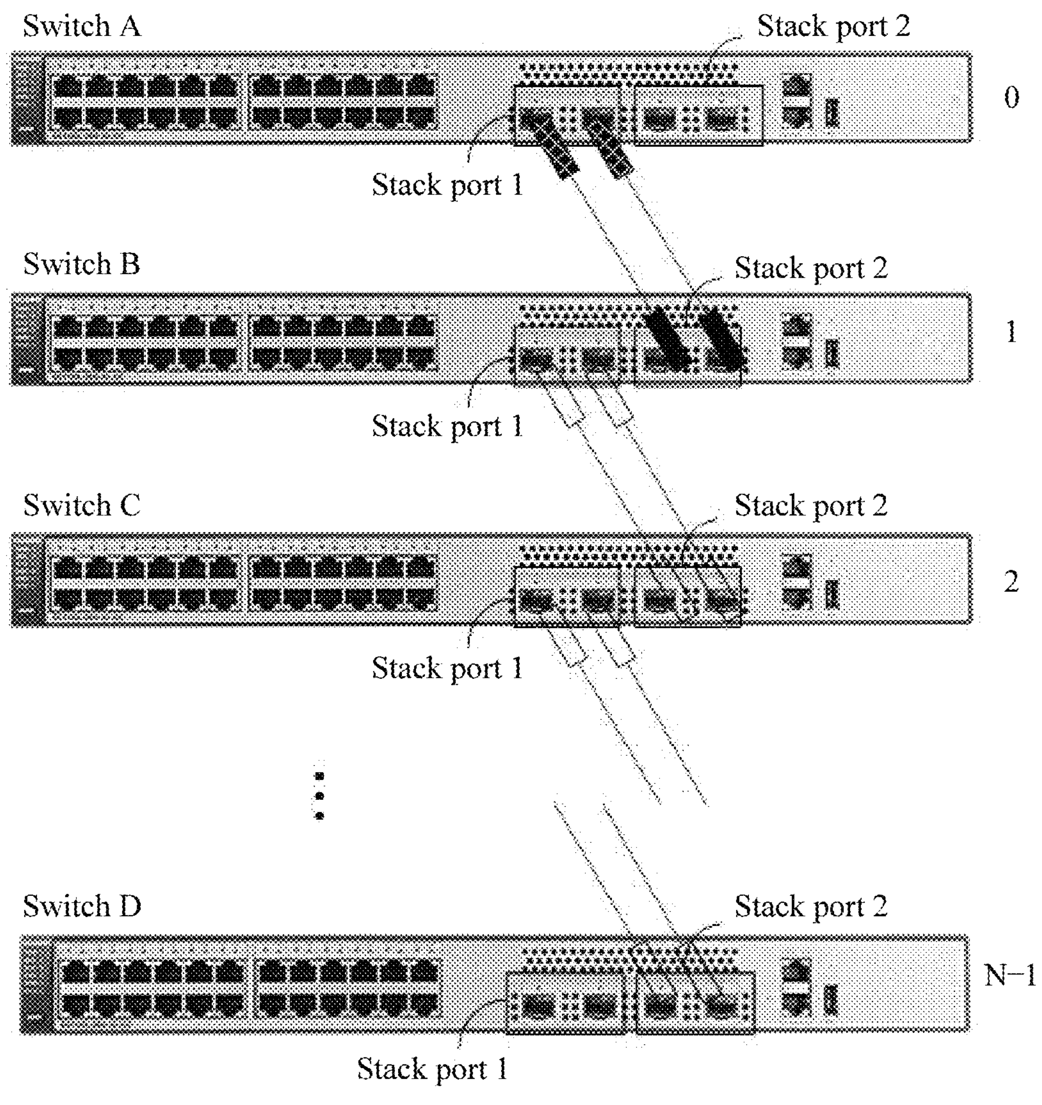
FIG. 3H is a schematic diagram of building a stack based on a chain topology by using switches in a stack according to this application.

Optionally, in case T1, as shown in FIG. 3H, the N stackable switches may alternatively build the stack based on a chain topology. If the value of the terminal identifier detected by the switch A is the specified value, the switch A assigns, by using the switch A as a start point, the identifier 0 to the switch A, the identifier 1 to the switch B, . . . , and the identifier N−1 to the switch D.

Case T2: One is a Z-type optical cable: An optical module located at one end of the optical cable stores the terminal identifier, and an optical module located at the other end of the optical cable stores no terminal identifier. The other is a Y-type optical cable: Optical modules that are separately located at two ends of the optical cable store no terminal identifier.

In case T2, as shown in FIG. 3E, two different types of optical cables, Z and Y, are used by the N stackable switches to build the stack based on the ring topology. If a switch detects that a value of a terminal identifier stored in an optical module that is connected to a stack port of the switch is the specified value, the switch (for example, the switch A) can assign identifiers to the N stackable switches along a direction starting from the switch to another switch connected to the stack port of the switch.

Figure 3I:
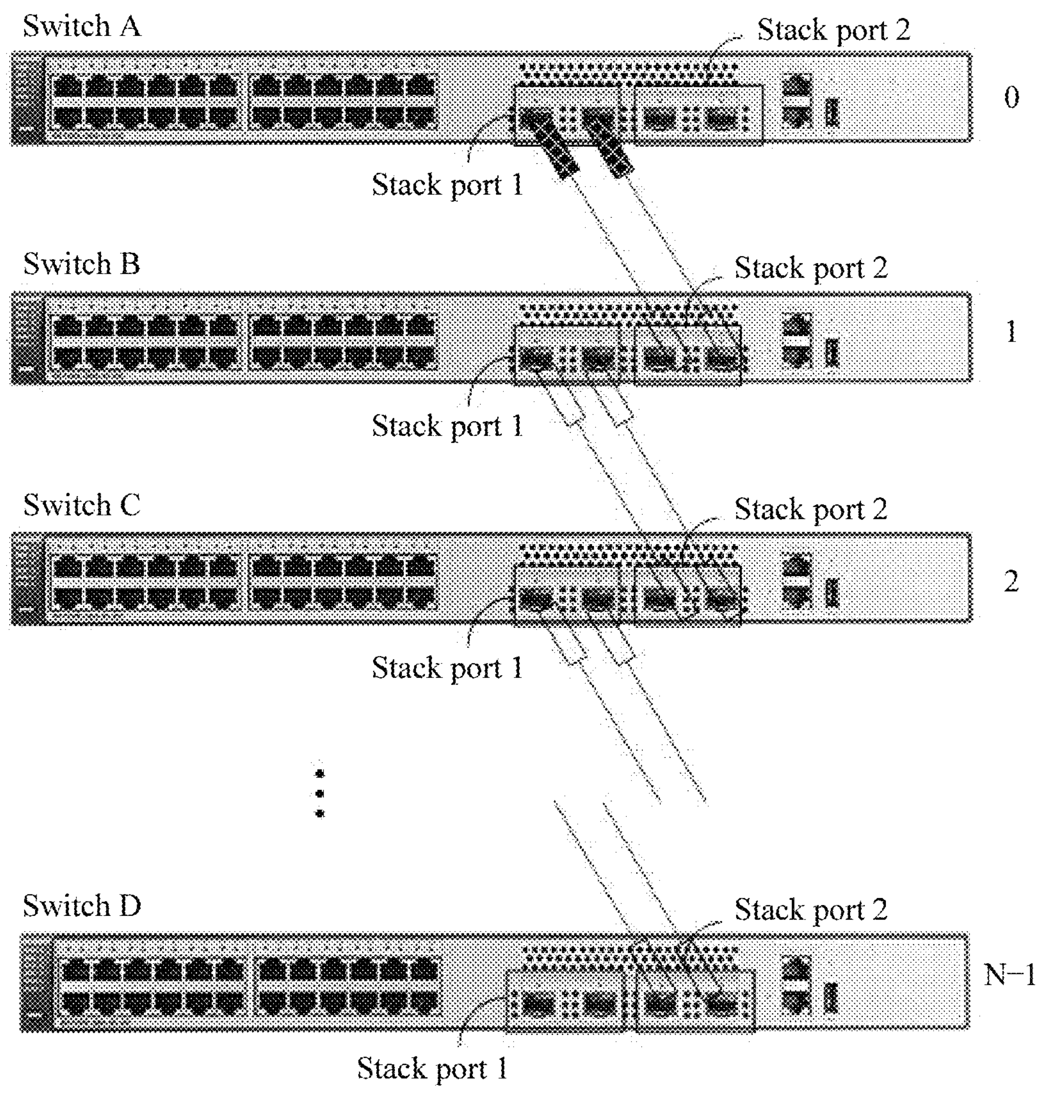
FIG. 3I is another schematic diagram of building a stack based on a chain topology by using switches in a stack according to this application.

Optionally, in case T2, as shown in FIG. 3I, the N stackable switches may alternatively build the stack based on the chain topology. If the value of the terminal identifier detected by the switch A is the specified value, the switch A assigns, by using the switch A as a start point, the identifier 0 to the switch A, the identifier 1 to the switch B, . . . , and the identifier N−1 to the switch D.

If only one type of optical cable is used by the N stackable switches to build the stack, the following two cases T3 and T4 may be included.

Case T3: X-Type Optical Cables are Used.

In case T3, as shown in FIG. 3F, the X-type optical cables are used by the N stackable switches to build the stack based on the ring topology. If a switch detects that all values of terminal identifiers stored in all optical modules that are connected to one or more stack ports of the switch are the specified value, the switch (for example, the switch A or the switch D) can assign identifiers to the N stackable switches along a direction starting from the switch to another switch connected to the stack port of the switch.

Figure 3J:
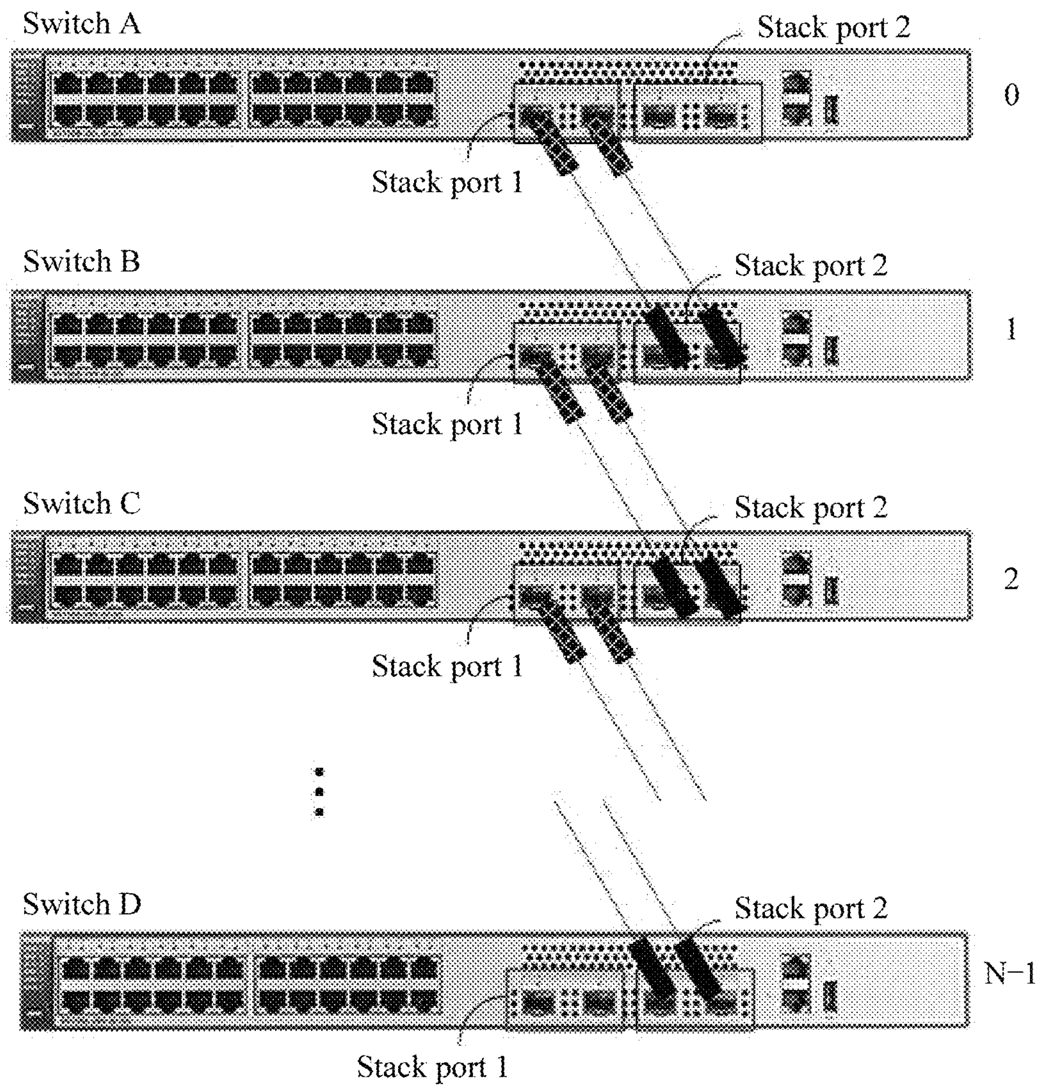
FIG. 3J is still another schematic diagram of building a stack based on a chain topology by using switches in a stack according to this application.

Optionally, in case T3, as shown in FIG. 3J, the N stackable switches may alternatively build the stack based on the chain topology. If values of terminal identifiers detected by the switch A are the specified value, the switch A assigns, by using the switch A as a start point, the identifier 0 to the switch A, the identifier 1 to the switch B, . . . , and the identifier N−1 to the switch D.

Case T4: Z-Type Optical Cables are Used.

In case T4, as shown in FIG. 3G, the Z-type optical cables are used by the N stackable switches to build the stack based on the ring topology. If a switch detects that all values of terminal identifiers stored in all optical modules that are connected to one or more stack ports of the switch are the specified value, the switch (for example, the switch A) can assign identifiers to the N stackable switches along a direction starting from the switch to another switch connected to the stack port of the switch.

Figure 3K:
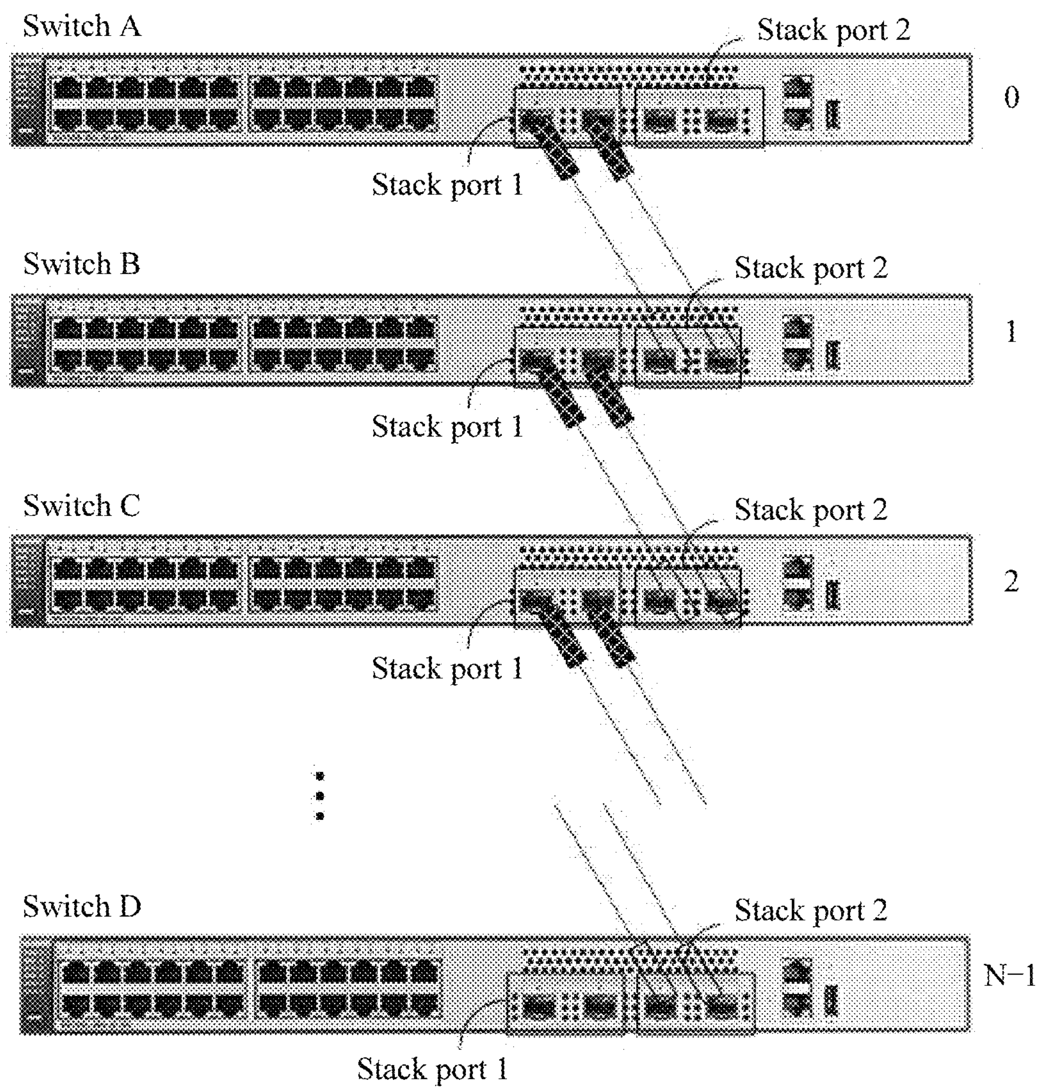
FIG. 3K is yet another schematic diagram of building a stack based on a chain topology by using switches in a stack according to this application.

Optionally, in case T4, as shown in FIG. 3K, the N stackable switches may alternatively build the stack based on the chain topology. If all values of the terminal identifiers detected by the switch A are the specified value, the switch A assigns, by using the switch A as a start point, the identifier 0 to the switch A, the identifier 1 to the switch B, . . . , and the identifier N−1 to the switch D.

In this embodiment of this application, first, the switch detects the terminal identifier stored in the optical cable that is connected to the stack port of the switch, where the optical module is at one end of the optical cable; then, if the condition is met, the switch assigns identifiers to the N stackable switches along the direction starting from the switch to another switch connected to the stack port, where the condition includes: the value of the terminal identifier is the specified value, and N is greater than or equal to 2; and finally, the N stackable switches are assigned the specified identifiers. This embodiment of this application resolves problems that the identifiers of the N stackable switches are randomly assigned and the identifiers of the N stackable switches need to be manually modified, thereby shortening deployment configuration time of the switches in the stack, and improving an efficiency of assigning the identifiers to the switches in the stack.

An embodiment of this application provides a device for assigning identifiers to switches in a stack, and the device may be the stackable switch according to the method embodiment in FIG. 2.

Figure 4:
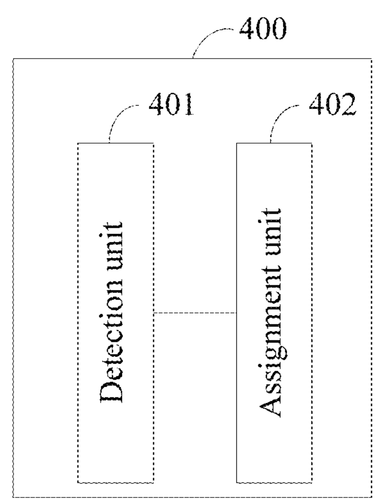
FIG. 4 is a schematic structural diagram of a device for assigning identifiers to switches in a stack according to this application.

FIG. 4 shows an example of a device for assigning identifiers to switches in a stack. As shown in FIG. 4, a device 400 may include: a detection unit 401 and an assignment unit 402.

The detection unit 401 may be configured to detect a terminal identifier stored in an optical module that is connected to a stack port of the switch, where the optical module is at one end of an optical cable;

The assignment unit 402 may be configured to: if a condition is met, assign identifiers to N stackable switches along a direction starting from the switch to another switch connected to the stack port, where the condition includes: a value of the terminal identifier is a specified value, and N is greater than or equal to 2. Optionally, the condition further includes: all values of terminal identifiers stored in all optical modules that are connected to one or more stack ports of the switch are the specified value.

It should be understood that the device 400 is merely an example provided in this embodiment of this application, and the device 400 may have more or fewer components than those shown, may combine two or more components, or may have different component configurations.

It can be understood that for a specific implementation of the functional modules included in the device 400 in FIG. 4, reference may be made to the method embodiment in FIG. 2. Details are not described herein again.

An embodiment of this application provides a device for assigning identifiers to switches in a stack, and the device may be the stackable switch according to the method embodiment in FIG. 2.

Figure 5:
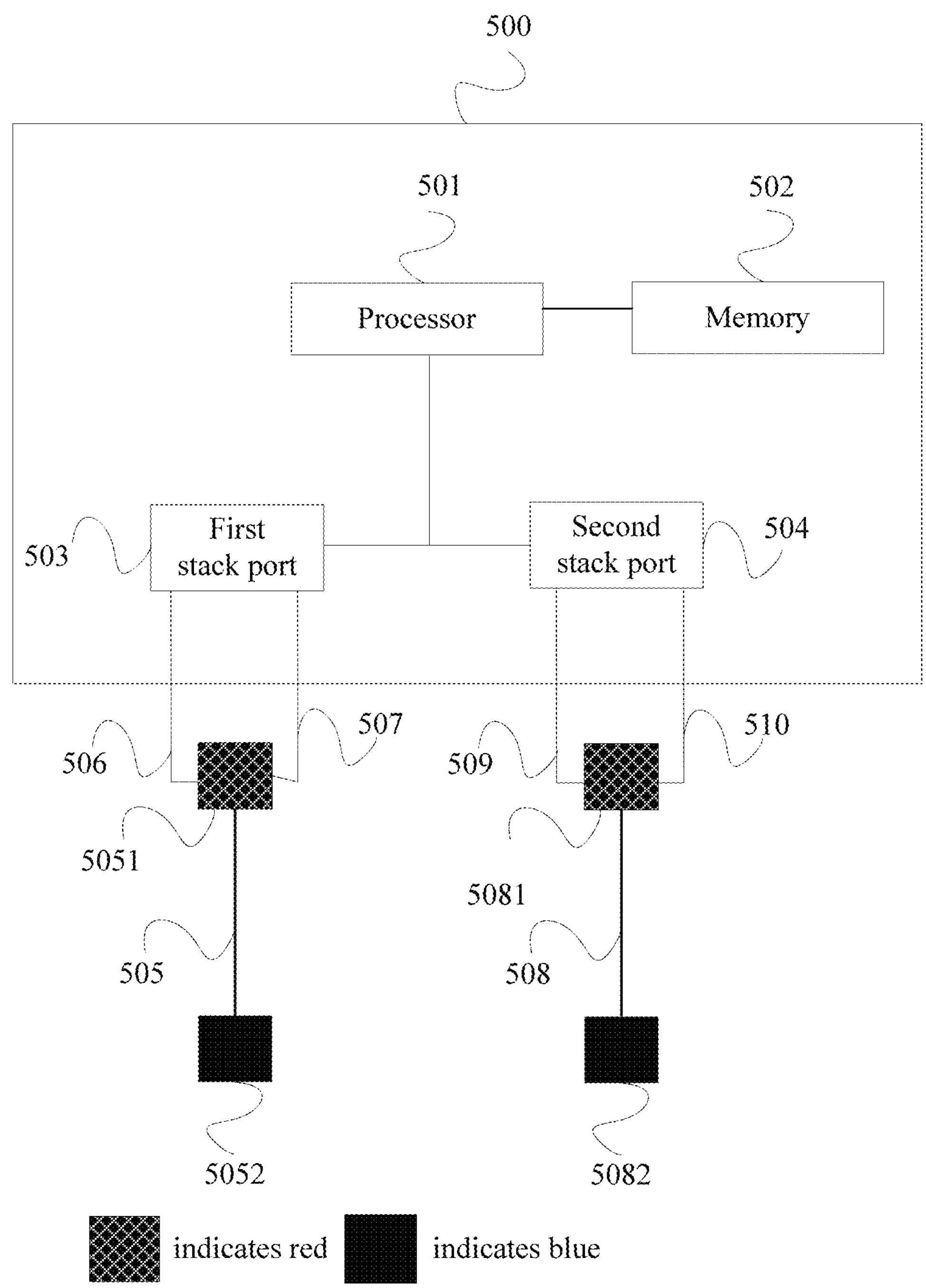
FIG. 5 is a schematic structural diagram of a device for assigning identifiers to switches in a stack according to this application.

FIG. 5 shows an example of a device for assigning identifiers to switches in a stack. In FIG. 5, the device includes two stack ports. It should be noted that in FIG. 5, the device may alternatively include only one stack port. As shown in FIG. 5, a device 500 may include: a processor 501, a memory 502, a first stack port 503, and a second stack port 504.

The first stack port 503 and the second stack port 504 may be dedicated stack ports for a stackable switch to build a stack, or may be non-dedicated stack ports that serve as stack ports.

The first stack port 503 and the second stack port 504 may be separately connected to a stackable switch by using an optical cable 509 and an optical cable 510.

The processor 501 may be a central processing unit (CPU), and may be configured to detect a terminal identifier stored in optical modules of the optical cable 509 and the optical cable 510 that are separately connected to the first stack port 503 and the second stack port 504.

The memory 502 may be a permanent memory, such as a flash memory and a hard disk drive. It should be noted that the memory 502 may store a device driver and a detection program that is used for detecting a terminal identifier stored in an optical module of the optical cable that is connected to the memory 502. The device driver may be used to drive the first stack port 503 and the second stack port 504.

The following describes in detail the structure of the device 500 with reference to FIG. 3F.

For example, the device 500 is a switch A. The first stack port 503 may be a stack port 1, and the second stack port 504 may be a stack port 2. The first stack port 503 may be connected to a switch B by using an optical cable 505, and the second stack port 504 may be connected to a switch D by using an optical cable 508. The device 500 may receive and send packet information of another switch in the stack by using the first stack port 503 and the second stack port 504.

The optical cable 505 includes an optical module 5051 and an optical module 5052, and the processor 501 may read, by using a data line 507, a terminal identifier stored in the optical module 5051, and may read, by using a control line 506, packet information stored in the optical module 5051. The optical module 5051 may be a first optical module, and the optical module 5052 may be a second optical module. A value of the terminal identifier stored in the optical module 5051 is different from a value of a terminal identifier stored in the optical module 5052, and the optical module 5051 and the optical module 5052 have different appearances.

The optical cable 508 includes an optical module 5081 and an optical module 5082, and the processor 501 may read, by using a data line 510, a terminal identifier stored in the optical module 5081, and may read, by using a control line 509, packet information stored in the optical module 5081. The optical module 5081 may be a first optical module, and the optical module 5082 may be a second optical module. A value of the terminal identifier stored in the optical module 5081 is different from a value of a terminal identifier stored in the optical module 5082, and the optical module 5081 and the optical module 5082 have different appearances.

When the device 500 is started, the foregoing detection program and device driver are loaded into the memory 502, and then are accessed and invoked by the processor 501. When the processor 501 detects that values of terminal identifiers stored in optical modules that are connected to two stack ports of the switch are a specified value, the device 500 may assign identifiers to N stackable switches.

It should be understood that the device 500 is only an example provided in this embodiment of this application, and the device 500 may have more or fewer components than those shown, may combine two or more components, or may have different component configurations.

It can be understood that for a specific implementation of the functional modules included in the device 500 in FIG. 5, reference may be made to the method embodiment in FIG. 2. Details are not described herein again.

What is claimed is:

1. A method implemented by a first switch, the method comprising:

detecting a plurality of terminal identifiers stored in a plurality of optical modules, wherein each of the optical modules connects to one of a plurality of stack ports of the first switch, and wherein each of the optical modules is located at a first end of an optical cable;

performing a comparison of the terminal identifiers to a pre-defined specified value; and assigning, based on the comparison, when all values of the terminal identifiers are a same value, and when the same value is the pre-defined specified value, different switch identifiers to N stackable switches along a selected direction selected from two possible directions, wherein the two possible directions are opposed to each other, wherein the selected direction is from the first switch to a second switch connected to the stack ports, and wherein N is greater than or equal to 2.

2. The method of claim 1, wherein the one of the plurality of stack ports is a non-dedicated stack port, and wherein the optical cable is a stack cable.

3. The method of claim 1, wherein a first optical module of the optical modules is located at a second end of the optical cable, wherein the second end is opposite the first end, and wherein the first optical module stores no terminal identifier.

4. The method of claim 1, wherein a first optical module of the optical modules is located at a second end of the optical cable, wherein the second end is opposite the first end, wherein the first optical module stores a first terminal identifier of the terminal identifiers, and wherein a first value of the first terminal identifier is not the pre-defined specified value.

5. The method of claim 1, wherein a position of each of the optical modules in the optical cable is distinguished by a terminal appearance.

6. The method of claim 5, wherein the terminal appearance comprises a terminal color, a terminal shape, a terminal pattern, or a terminal character.

7. The method of claim 1, wherein the pre-defined specified value is 0 or 1.

8. A first switch comprising:

a plurality of stack ports configured to connect to a plurality of optical modules, wherein each of the optical modules is located at a first end of an optical cable;

a detector configured to detect a plurality of terminal identifiers stored in the optical modules; and an assigner coupled to the detector and configured to assign, based on a comparison of the terminal identifiers to a pre-defined specified value, when all values of the terminal identifiers are a same value, and when the same value is the pre-defined specified value, different switch identifiers to N stackable switches along a selected direction selected from two possible directions, wherein the two possible directions are opposed to each other, wherein the selected direction is from the first switch to a second switch connected to the stack ports, and wherein N is greater than or equal to 2.

9. The first switch of claim 8, wherein the one of the plurality of stack ports is a non-dedicated stack port, and wherein the optical cable is a stack cable.

10. The first switch of claim 8, wherein a first optical module of the optical modules is located at a second end of the optical cable, wherein the second end is opposite the first end, and wherein the first optical module stores no terminal identifier.

11. The first switch of claim 8, wherein a first optical module of the optical modules is located at a second end of the optical cable, wherein the second end is opposite the first end, wherein the first optical module stores a first terminal identifier of the terminal identifiers, and wherein a first value of the first terminal identifier is not the pre-defined specified value.

12. The first switch of claim 8, wherein a position of each of the optical modules in the optical cable is distinguished by a terminal appearance.

13. The first switch of claim 12, wherein the terminal appearance comprises a terminal color, a terminal shape, a terminal pattern, or a terminal character.

14. The first switch of claim 8, wherein the pre-defined specified value is 0 or 1.

15. A first device comprising:

a plurality of stack ports; and a processor coupled to the stack ports and configured to:

detect a plurality of terminal identifiers stored in a plurality of optical modules connected to the stack ports, wherein each of the optical modules is located at a first end of an optical cable;

perform a comparison of the terminal identifiers to a pre-defined specified value; and assign, based on the comparison, when all values of the terminal identifiers are a same value, and when the same value is the pre-defined specified value, different switch identifiers to N stackable devices along a selected direction selected from two possible directions, wherein the two possible directions are opposed to each other, wherein the selected direction is from the first device to a second device connected to the stack ports, and wherein N is greater than or equal to 2.

16. The first device of claim 15, wherein the one of the plurality of stack ports is dedicated for stacking.

17. The first device of claim 15, wherein the one of the plurality of stack ports is for communicating with other devices in a stack.

18. The first device of claim 17, wherein the stack comprises the N stackable devices behaving as a single device.

19. The first device of claim 15, wherein the pre-defined specified value is 0 or 1.

* * * * *